US012762596B2

(12) United States Patent
Saad et al.

(10) Patent No.: US 12,762,596 B2
(45) Date of Patent: Oct. 13, 2026

(54) DETERMINING AND PRESENTING ATTRIBUTES FOR SEARCH

(71) Applicant: ADOBE INC., San Jose, CA (US)

(72) Inventors: Michele Saad, Austin, TX (US); Robert William Burke, Jr., Pottboro, TX (US); Irgelkha Mejia, River Edge, NJ (US); Ronald Eduardo Oribio, Austin, TX (US)

(73) Assignee: ADOBE INC., San Jose, CA (US)

( * ) Notice: Subject to any disclaimer, the term of this patent is extended or adjusted under 35 U.S.C. 154(b) by 638 days.

(21) Appl. No.: 18/295,104

(22) Filed: Apr. 3, 2023

(65) Prior Publication Data

US 2024/0331003 A1 Oct. 3, 2024

(51) Int. Cl.
*G06Q 30/00* (2023.01)
*G06Q 30/0601* (2023.01)

(52) U.S. Cl.
CPC ..... *G06Q 30/0627* (2013.01); *G06Q 30/0631* (2013.01); *G06Q 30/0643* (2013.01)

(58) Field of Classification Search
None
See application file for complete search history.

(56) References Cited

U.S. PATENT DOCUMENTS 8,782,029 B1 7/2014 Yee et al.
8,874,499 B2 10/2014 Tiwari et al.
9,008,435 B2 4/2015 Gokturk et al.
10,817,749 B2 10/2020 Biswas et al.
11,055,557 B2 7/2021 Chatterjee et al.
2003/0208399 A1 11/2003 Basak et al.
2008/0033915 A1* 2/2008 Chen .................... G06F 16/951
2015/0294377 A1* 10/2015 Chow ................ G06Q 30/0263 705/347
2019/0354609 A1* 11/2019 Huang .................... G06F 16/51
2024/0112253 A1* 4/2024 Suprasadachandran Pillai ........... G06Q 30/0205
2024/0202203 A1* 6/2024 Kostakis ........... G06F 16/24542

* cited by examiner

*Primary Examiner* — Mila Airapetian
(74) *Attorney, Agent, or Firm* — Shook Hardy & Bacon L.L.P.

(57) ABSTRACT

A search system determines a hierarchy of attributes for a set of search results and returns the search results based on a top-ranked attribute. The search system identifies item listings based on a search input and determines attributes of the item listings. A machine learning model generates a hierarchy of the attributes. The search results are provided based on a top-ranked attribute from the hierarchy of the attributes.

15 Claims, 8 Drawing Sheets

DETERMINING AND PRESENTING ATTRIBUTES FOR SEARCH

BACKGROUND

Search engines facilitate identifying and returning relevant items from electronic databases, such as, for instance, databases of products. Generally, search engines receive search queries from users and provide search results for items that are responsive to the search queries. For a given search query, a search engine processes the search query, as well as other parameters (e.g., user data, contextual data, and/or other inputs), to identify the most relevant items for the particular search. Search results for identified items can be presented on a user device in several different forms via a search results user interface.

SUMMARY

Some aspects of the present technology relate to, among other things, a search system that determines a hierarchy of attributes associated with search results and provides a visual indication of a highest-ranked attribute and/or attribute values for items in the context of the search results. Item listings are identified in response to a search input, and attributes are determined from the item listings. The attributes are ranked by a model. In some aspects, an attribute is ranked higher within the hierarchy of attributes based on its potential relevance to a user intent. In some instances, the model input includes information extracted from the search results (e.g., from thumbnail images and textual descriptions of the search results) that causes attributes that are not readily discernable from the search results to be ranked higher. Search results are provided based on a top-ranked attribute. In some cases, this includes providing a visual indication of the top-ranked attribute and/or an attribute value with at least one of the search results.

Further aspects of the technology described herein are directed to training the model to identify and/or rank attributes to provide a hierarchy of attributes for a set of search results. For example, the model can be trained via reinforcement learning or other machine learning techniques to prioritize attributes from product reviews, product returns, and/or related search data (e.g., search query logs and user browsing data) so that the highest-ranked attribute(s) identified by the model are the attributes most relevant to user search intent.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein.

DETAILED DESCRIPTION

Definitions

Figure 1:
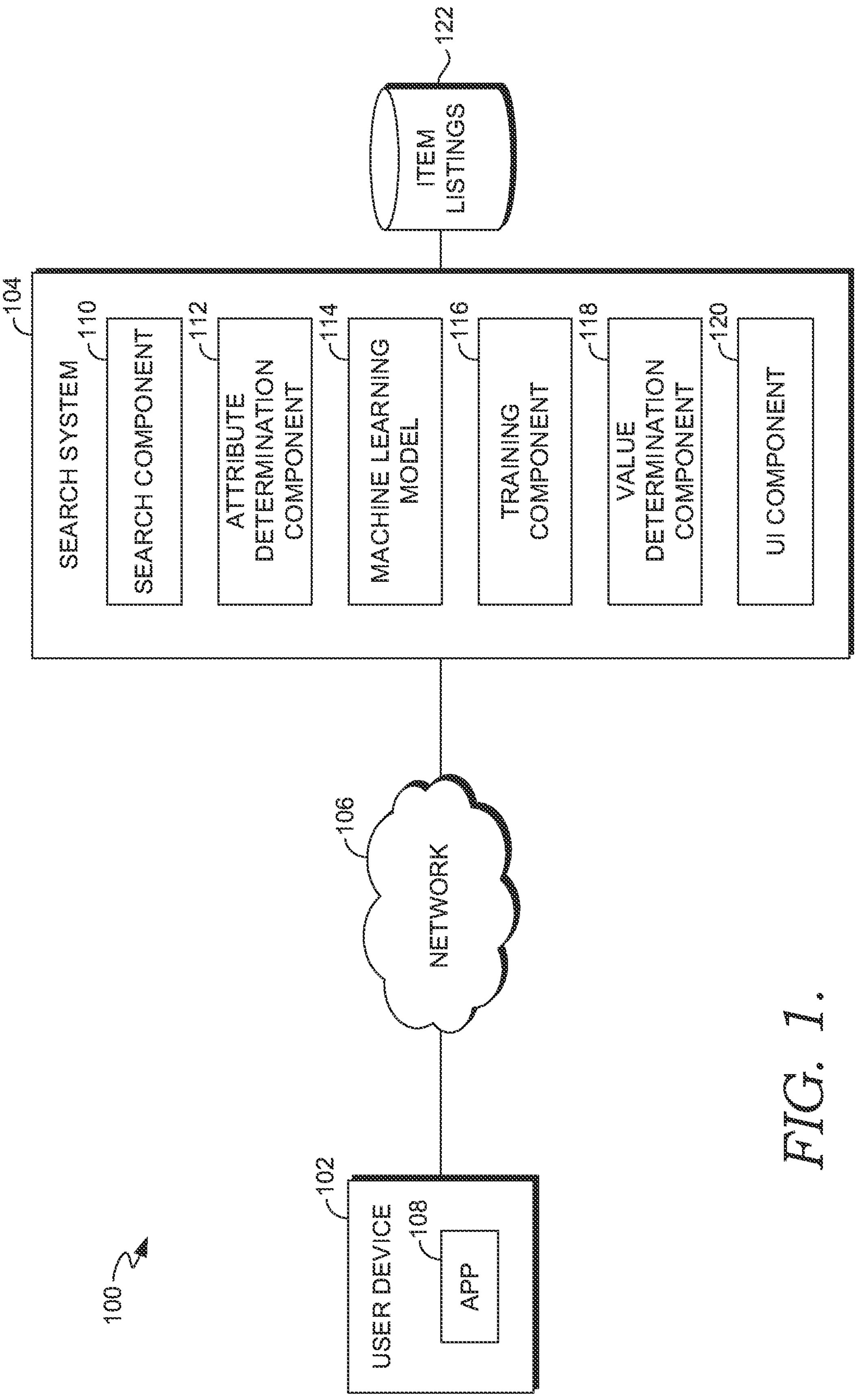
FIG. 1 is a block diagram illustrating an exemplary system in accordance with some implementations of the present disclosure.

Various terms are used throughout this description. Definitions of some terms are included below to provide a clearer understanding of the ideas disclosed herein.

As used herein, an "item listing" refers to a web page providing information for an item. An item listing can include, among other things, a title identifying the item, a textual description of the item (an "item description"), an image of the item, a video of the item, and one or more reviews submitted by users regarding the item. An item listing can include both unstructured data (e.g., a general text description of the item) and structured data (e.g., an indication of a particular value for a particular attribute of the item). An item listing can be provided, for instance, by a listing platform that provides items available for purchase, rental, streaming, etc.

An "item" can comprise, for instance, a physical product, digital content, or a service. An item can be associated with a particular "item type" that indicates a category of the item.

A "search result" comprises a summary of information (e.g., a search snippet) for an item listing that is returned for display in response to a search query. A search result could include, for instance, a thumbnail image and a short textual description (e.g., a title of an item and/or a short description).

A "listing platform" refers to a site for identifying products or services listed for purchase or rent in response to user input from a client device upon navigation to the site. A listing platform provides interfaces for surfacing of item listings as search results, such as interfaces for receiving search queries and/or filter options. In some instances, a listing platform provides interfaces for searching item listings available at one or more third-party listing platforms.

As used herein, an "attribute" comprises a feature of an item or a portion of an item determined from textual or visual analysis of the item and/or a corresponding item listing. By way of example only and not limitation, an attribute for an item could comprise a dimension, a material type, a shape, or a color of the item or a portion of the item.

As used herein, a "value" refers to an instance of an attribute. By way of example and not limitation, an example value for the attribute "color" is "blue".

As used herein, "review data" refers to data corresponding to one or more reviews (e.g., user reviews) of an item. Review data can comprise review titles, review text, and/or item ratings (e.g., five out of five stars) for items, for example.

As used herein, "return data" refers to data associated with user returns of items. Return data can comprise, for example, a return reason (e.g., a reason why the user returned the item).

As used herein, "related search query data" refers to data regarding one or more search queries that are related to another search query conceptually and/or temporally. For example, if a user searches for "cake platter" and, 30 seconds later (for example), searches for "glass cake platter," the fact that the user searched for "glass cake platter" (and/or the corresponding search results or item listings) can be related search query data for the "cake platter" query.

As used herein, "user interaction data" refers to data regarding item listings with which a user has interacted.

As used herein, "user browsing data" refers to data regarding a user's browsing activities. User browsing data can comprise user browsing history (e.g., pages visited, including timestamps) and user interests, for example.

As used herein, "user purchase data" refers to data regarding items purchased by a user.

Overview

When browsing items online, users can be overwhelmed by the quantity and variety of items available. This can especially be the case for sites with large catalogs of items. Moreover, item-related information provided to users in response to search queries, which is typically limited to a thumbnail image and a brief textual description of the item, often does not include information that could be material to a user's search intent or ability to discern certain items. For instance, in some instances, certain attributes of items are not readily discernable from the search results, and the user must continue to select to view item listings or otherwise issue additional searches and filters to discover relevant attributes of the items. As an example to illustrate, if a user submits a search query for "cake stands," the set of search results includes various cake stands of different sizes, but the size of each cake stand is not discernable from the search results themselves. To determine the size of each cake stand, the user must select to view various item listings and review the descriptions.

As a result of shortcomings of conventional search systems, users often have to open numerous item listings and/or submit multiple search queries in order to find desired items. For example, a user could issue a first search query to a search engine that returns a set of search results, browse the search results, and select certain search results to access the corresponding items. Selection of items causes retrieval of the items from various content sources. Additionally, in some cases, applications supporting those items are launched in order to render the items. Often, the search results returned by the search engine do not satisfy the user's goal, requiring the user to spend more time on the search process by repeating the process of issuing additional search queries and selecting certain search results until the user finally accesses a desired item or, in some cases, the user gives up because the search engine was not able to return desired search results even after multiple searches. These repetitive inputs result in increased computing resource consumption, among other things. For instance, repetitive search queries result in packet generation costs that adversely affect computer network communications. Each time a user issues a search query, the contents or payload of the search query is typically supplemented with header information or other metadata within a packet in TCP/IP and other protocol networks. Accordingly, when this functionality is multiplied by all the inputs needed to obtain the desired data, there are throughput and latency costs by repetitively generating this metadata and sending it over a computer network. In some instances, these repetitive inputs (e.g., repetitive clicks, selections, or queries) increase storage device I/O (e.g., excess physical read/write head movements on non-volatile disk) because each time a user inputs unnecessary information, such as inputting several queries, the computing system often has to reach out to the storage device to perform a read or write operation, which is time consuming, error prone, and can eventually wear on components, such as a read/write head. Further, if users repetitively issue search queries, it is expensive because processing search queries consumes a lot of computing resources. For example, for some search engines, a query execution plan is calculated each time a search query is issued, which requires a search system to find the least expensive query execution plan to fully execute the search query. This decreases throughput and increases network latency and can waste valuable time.

Aspects of the technology described herein improve the functioning of the computer itself in light of these shortcomings in existing search technologies by providing a search system that determines relevant item attributes for a set of search results (e.g., attributes that are relevant but not necessarily obvious or visible without opening item listings) and provides an indication of a highest-ranked attribute and/or corresponding attribute values for items within the context of the search results. The attributes can be extracted from images and/or text in item listings corresponding to the search results. An attribute could be, for example, a dimension, a material type, a shape, or a color of an item.

In accordance with some aspects of the technology described herein, the search system identifies item listings based on a search query received from a user. The system determines and selects attributes of the item listings—e.g., by extracting features from the item listings. In some instances, features are extracted from text or images in the item listings. Attributes can be selected based on values for the attributes differing between item listings. For example, if a user searches "cake platters," the attribute "material" could be selected if item listings describe some cake platters as being made from glass and others as being made from plastic. However, an attribute such as "color" would not be selected, in some configurations, if all (or nearly all) of the cake platters are white, as color would not be a useful way to distinguish between the relevant cake platters.

The search system organizes the attributes into a hierarchy (i.e., ranks the attributes)—e.g., according to their relevance to a user intent or ability to otherwise demonstrate differences between the items. In accordance with the technology described herein, attributes are ranked by a model (e.g., a machine learning model), which is trained on one or more of a variety of data types. For example, the model can be trained to rank attributes based on historical browsing data, related search query data, review data, return data, and/or user purchase data. Such data provides insights regarding important attributes for items that are leveraged by the model to rank attributes for a set of search results for a given query. For instance, historical search and browsing data could indicate that when users have historically searched for "cake stands," the search results are often subsequently filtered based on "material". As another example, review data could include a high frequency of the material of the cake stands being discussed. As a further example, return data could indicate that users often return cake stands of a particular material (e.g., wood). As still another example, user purchase data could indicate that users typically purchase glass cake stands. Based on such data, the model learns that material is an important attribute for cake stands. In some aspects, information regarding the user submitting the search query could also be leveraged to personalize the attribute ranking. For instance, if the user has historically purchased ceramic cookware and avoided plastic cookware, the model could rank "material" above other attributes.

In some configurations, when ranking attributes for a search of search results, the model takes as input information obtained from the search results, including thumbnail images and textual descriptions included in the search results. The information allows the model to consider attributes that already explicitly appear or are otherwise inferable from the search results themselves and use the information when ranking attributes for the search results. For instance, in some aspects, the model could be configured to rank higher attributes that are not apparent from the search results.

The search system provides a set of search results in response to the search query based on a highest-ranked attribute. In some instances, the search system provides a visual indication of a value of a top-ranked attribute for at least one item in the context of the search result for the item. In accordance with some aspects described herein, the system overlays a textual indication of the attribute and the value onto a search result associated with an item (e.g., "material: ceramic"), thus indicating to the user that the item comprises the value (e.g., that the cake platter is ceramic). Accordingly, the user can quickly identify key attributes of the item without needing to visit the item listing for the item.

Aspects of the technology described herein provide a number of improvements over existing search technologies. For instance, computing resource consumption is improved relative to existing technologies. In particular, providing values of relevant attributes in the context of search results eliminates (or at least reduces) the repetitive search queries, search result selections, and rendering of item listings because the presented attribute values facilitate identification of relevant or desired search results for items with attributes that correspond to what the user is seeking without the need to continuously input various search queries to access relevant search results. Accordingly, aspects of the technology described herein decrease computing resource consumption, such as packet generation costs. For instance, a search query (e.g., an HTTP request) would only need to traverse a computer network once (or fewer times relative to existing technologies). Specifically, the contents or payload of the search query is supplemented with header information or other metadata within a packet in TCP/IP and other protocol networks once for the initial user query. Such a packet for a search query is only sent over the network once (or fewer times relative to existing technologies). Thus, there is no (or less) repetitive generation of metadata and continuous sending of packets over a computer network.

In like manner, aspects of the technology described herein improve storage device or disk I/O and query execution functionality, as they only need to go out to disk a single time (or fewer times relative to existing search technologies). As described above, the inadequacy of search results provided by existing search technologies results in repetitive search queries, search result selections, and item renderings. This causes multiple traversals to disk. In contrast, aspects described herein reduce storage device I/O because only minimal inputs are received and so the computing system does not have to reach out to the storage device as often to perform a read or write operation. For example, in accordance with aspects described herein, the search engine allows users to locate desired items without performing repetitive search queries and without needing to open an excessive number of item listings. Accordingly, there is not as much wear on components, such as a read/write head, because disk I/O is substantially reduced.

Various configurations also improve query execution resource savings. For example, the search system calculates a query execution plan on fewer search queries relative to existing search technologies. This increases throughput and decreases network latency because aspects of the technology described herein do not have to repetitively calculate query execution plans because fewer search queries need to be executed, unlike existing search technologies.

Downstream benefits are also provided by aspects of the technology described herein. For instance, critical item information (e.g., that a television does not have any HDMI ports) is often buried in lengthy item descriptions. Users often purchase items unaware of such information and later return the items as a result. The use of the search system described herein more effectively prevents users from purchasing items that do not have attributes of interest, thereby reducing returns.

Example System for Determining and Presenting Attributes for Search

With reference now to the drawings, FIG. 1 is a block diagram illustrating an exemplary system 100 for presenting attributes and using the attributes for search in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, various functions can be carried out by a processor executing instructions stored in memory.

The system 100 is an example of a suitable architecture for implementing certain aspects of the present disclosure. Among other components not shown, the system 100 includes a user device 102 and a search system 104. Each of the user device 102 and search system 104 shown in FIG. 1 can comprise one or more computer devices, such as the computing device 800 of FIG. 8 discussed below. As shown in FIG. 1, the user device 102 and the search system 104 can communicate via a network 106, which can include, without limitation, one or more local area networks (LANs) and/or wide area networks (WANs). Such networking environments are commonplace in offices, enterprise-wide computer networks, intranets, and the Internet. It should be understood that any number of user devices and server devices can be employed within the system 100 within the scope of the present technology. Each can comprise a single device or multiple devices cooperating in a distributed environment. For instance, the search system 104 could be provided by multiple server devices collectively providing the functionality of the search system 104 as described herein. Additionally, other components not shown can also be included within the network environment.

The user device 102 can be a client device on the client side of operating environment 100, while the search system 104 can be on the server side of operating environment 100. The search system 104 can comprise server-side software designed to work in conjunction with client-side software on the user device 102 so as to implement any combination of the features and functionalities discussed in the present disclosure. For instance, the user device 102 can include an application 108 for interacting with the search system 104. The application 108 can be, for instance, a web browser or a dedicated application for providing functions, such as those described herein. This division of operating environment 100 is provided to illustrate one example of a suitable environment, and there is no requirement for each implementation that any combination of the user device 102 and the search system 104 remain as separate entities. While the operating environment 100 illustrates a configuration in a networked environment with a separate user device and search system, it should be understood that other configurations can be employed in which components are combined. For instance, in some configurations, a user device can also provide some or all of the capabilities of the search system 104 described herein.

The user device 102 can comprise any type of computing device capable of use by a user. For example, in one aspect, the user device can be the type of computing device 800 described in relation to FIG. 8 herein. By way of example and not limitation, the user device 102 can be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device. A user can be associated with the user device 102 and can interact with the search system 104 via the user device 102.

At a high level, the search system 104 determines a hierarchy of attributes for item listings identified in response to a search query and exposes attribute values for items within the context of the search results. As shown in FIG. 1, the search system 104 includes a search component 110, an attribute determination component 112, a machine learning model 114, a training component 116, a value determination component 118, and a user interface (UI) component 120. The components of the search system 104 can be in addition to other components that provide further additional functions beyond the features described herein. The search system 104 can be implemented using one or more server devices, one or more platforms with corresponding application programming interfaces, cloud infrastructure, and the like. While the search system 104 is shown separate from the user device 102 in the configuration of FIG. 1, it should be understood that in other configurations, some or all of the functions of the search system 104 can be provided on the user device 102.

In one aspect, the functions performed by components of the search system 104 are associated with one or more applications, services, or routines. In particular, such applications, services, or routines can operate on one or more user devices, servers, can be distributed across one or more user devices and servers, or be implemented in the cloud. Moreover, in some aspects, these components of the search system 104 can be distributed across a network, including one or more servers and client devices, in the cloud, and/or can reside on a user device. Moreover, these components, functions performed by these components, or services carried out by these components can be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 100, it is contemplated that in some aspects, functionality of these components can be shared or distributed across other components.

In some examples, the search system 104 is part of a listing platform. Examples of listing platforms include e-commerce platforms, in which listed products or services are available for purchase by a user of a client device upon navigation to the platforms. Other examples of listing platforms include rental platforms listing various items for rent (e.g., equipment, tools, real estate, vehicles, contract employees) and media platforms listing digital content items (e.g., content for download). A listing platform can comprise any site for identifying products or services listed for purchase or rent by a user of a client device upon navigation to the site, including items that are available at one or more third-party listing platforms.

The functionality of a listing platform includes provision of interfaces enabling surfacing of item listings for items to users of the listing platform. Item listings for items available for sale/rent via the listing platform are stored by the item listings datastore 122. Each item listing can include one or more of a description relating to the item, a price in a currency, reviews, images of the item, shipment options, a rating, a condition of the item, a size of the item, a color of the item, etc. In aspects, the item is associated with one or more categories including meta-categories and leaf categories. For example, the meta-categories are each divisible into subcategories (or branch categories), whereas leaf categories are not divisible. In some aspects, the item listings datastore 122 comprises a search index that stores structured data regarding item listings to facilitate searching the item listings.

The search component 110 identifies item listings from the datastore 122 based on a search query received from a user device 102, for example. The search component 110 also retrieves search results for the identified item listings. A search result can include a title and a thumbnail image, for example, and/or other information descriptive of a corresponding item listing.

The attribute determination component 112 determines attributes of items for item listings identified by the search component 110. In some aspects, the attribute determination component 112 is configured to obtain attribute information from one or more fields of item listings identified by the search component 110. For example, if an item listing identified by the search component 110 comprises a field labeled "diameter," the attribute determination component 112 can determine that "diameter" is an attribute of the item listing.

In some aspects, the attribute determination 112 determines (or infers) the existence of an attribute from any field in an item listing. For example, in aspects, the attribute determination component 112 determines attributes based on fields that contain item metadata—e.g., information contained in an item listing that is not directly descriptive of the item described in the item listing. Examples of product metadata include seller information, listing date, and price. Alternatively, or in addition, the attribute determination component 112 determines attributes based on item information—e.g., information directly descriptive of the item described in the item listing. Examples of item information include item dimensions (e.g., length, width, height, and diameter), material, color(s), and sheen.

In the same or other aspects, attributes are predefined for a category of items or item listings. For example, if a user searches for "open-world video games," the search component 110 can identify "video games" as the product category being searched by the user, and in turn, the attribute determination component 112 can retrieve a predetermined list of attributes relevant to user search intent when considering which video game to purchase (e.g., publisher, genre, or Entertainment Software Rating Board (ESRB) rating).

In the same or other aspects, the attribute determination component 112 is (or comprises) a model (e.g., a language-processing model or the machine learning model 114). When the attribute determination component 112 is a model, it could extract features from text and/or images in item listings and infer attributes from the extracted features. This approach is particularly useful when the item listings identified by the search component 110 contain unstructured attribute information. For example, an item listing for a cake platter could contain information regarding the cake platter's diameter, but that information is not included in an easy-to-parse, standalone field labeled "diameter" or "dimensions," for example. Thus, the attribute determination component 112 is more likely to successfully identify "diameter" as an attribute of the item if it comprises a model (e.g., a natural language processing (NLP) model) that has been trained to parse attributes from item listings.

In order to determine attributes of the item listings, the attribute determination component 112 analyzes (e.g., parses, or takes as inputs) a plurality of the item listings identified by the search component 110. In aspects, the plurality of item listings analyzed by the attribute determination component 112 comprises all item listings identified by the search component 110. However, when the number of item listings identified by the search component 110 is large, it can be impractical (e.g., too computationally expensive) to analyze all such item listings. Thus, in some aspects, the attribute determination component 112 analyzes only a subset of the item listings. For example, the attribute determination component 112 can be configured to analyze item listings until a numerical limit is reached—e.g., 5, 10, 20, 100, or 1,000 item listings. In the same or other aspects, the search component 110 assigns each item listing a relevance score (e.g., based on the respective item listing's relevance to the search query) and the attribute determination component 112 is configured only to analyze item listings identified by the search component 110 that exceed an absolute relevance score threshold (e.g., 80 out of 100) or a percentage of the most relevant item listings (e.g., the top 10% most relevant item listings). Any combination of the above approaches is contemplated herein—e.g., (a) the top 10% most relevant item listings up to a limit of 100 item listings, or (b) the top 20% most relevant item listings that have a relevance score of at least 90 out of 100 up to a limit of 50 item listings.

In some cases, however, one or more attributes determined by the attribute determination component 112 can be irrelevant to the user because many or all of the item listings identified by the search component 110 comprise the same value for the attribute. To illustrate, if a user searches for "white cake platter," many or all of the item listings returned by the search component 110 could comprise the value "white" for the attribute "color".

Accordingly, in some aspects, after determining attributes, the attribute determination component 112 additionally filters out attributes that are not useful in distinguishing item listings identified by the search component 110 from one another. For example, in aspects, the attribute determination component 112 identifies item listings' values for each attribute determined by the attribute determination component 112. (The item listings can be the same plurality of item listings analyzed by the attribute determination component 112 in order to determine the attributes.) If, for example, all (or nearly all) of the item listings comprise the same value or no value (e.g., "null") for a given attribute, the attribute is likely not a useful way for the search system 104 to distinguish item listings from one another. Accordingly, in aspects, the attribute determination component 112 can omit such attribute(s) from the set of attributes it outputs (e.g., provides to the model 114 for ranking).

The search system 104 further comprises a model 114 and a training component 116. The model 114 takes, as inputs, the attributes identified by the attribute determination component 112 and ranks the attributes. In aspects, the purpose of ranking the attributes using the model 114 is to organize the attributes based on their potential relevance to a user search intent or to facilitate identification of differentiating attributes of items from the search results. In some embodiments, in addition to ranking the attributes, the model 114 includes some or all of the functionality of the attribution determination component 112 (e.g., is trained to both determine and rank the attributes).

Figure 2:
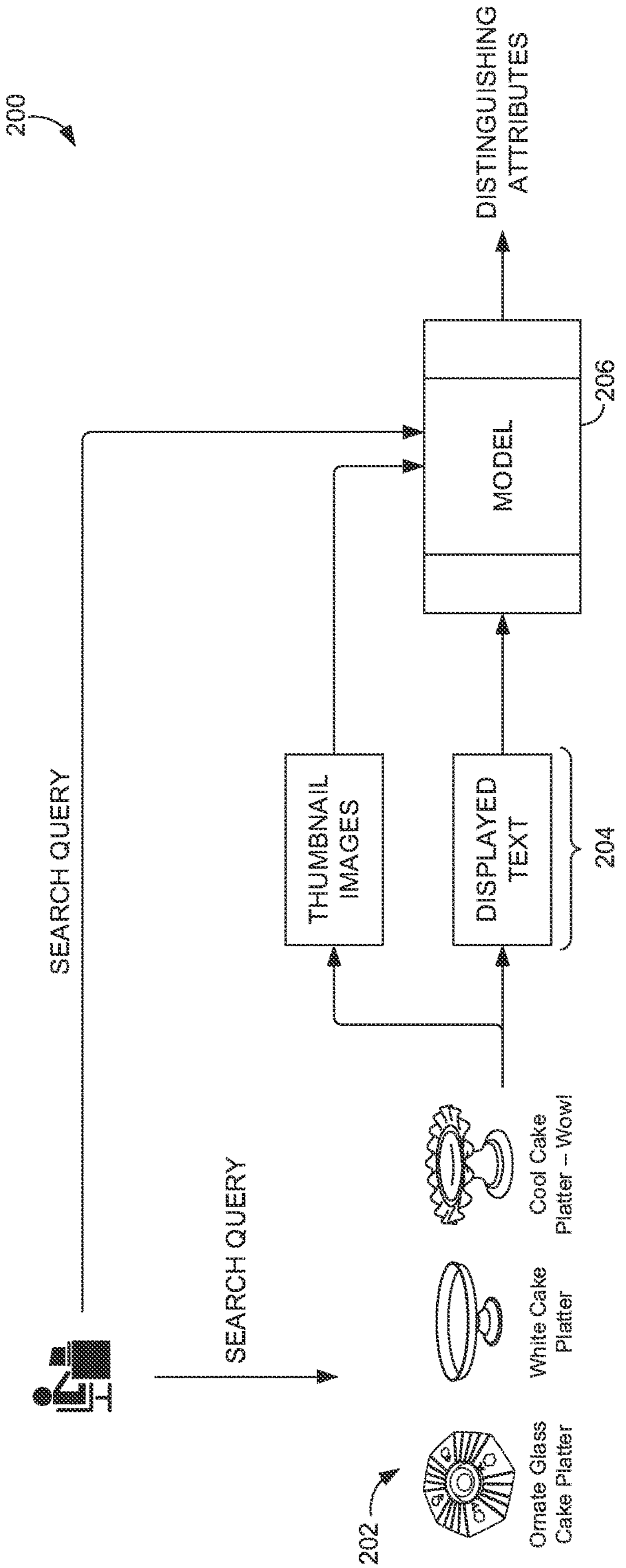
FIG. 2 is a diagram illustrating a process for analyzing search results using a model in accordance with some implementations of the present disclosure.

In some aspects, the model 114 leverages information included in the search results when ranking attributes for the set of search results. FIG. 2 illustrates an example process 200 for analyzing search results 202 using a model 206 (which can correspond to the model 114) in order to leverage information included in the search results 202. Search results 202 are determined (e.g., by the search component 110) based on a search query. The search results 202 are analyzed or parsed—e.g., by the model 206 and/or the attribute determination component 112—in order to determine whether (or to what extent) identified attributes (and/or values of those attributes) are present in the search results 202. In some aspects, thumbnail images and/or titles of the search results 202 are analyzed. If an attribute is visible in thumbnail images and/or titles of the search results 202, providing an additional visual indication of the attribute can be of limited information value. Thus, in one example, the larger the proportion of thumbnail images and/or titles that contain an attribute (or a value thereof), the lower the model 206 ranks the attribute. In the same or other aspects, the smaller the proportion of thumbnail images and/or titles that contain an attribute (or a value thereof), the higher the model 206 ranks the attribute.

Figure 3:
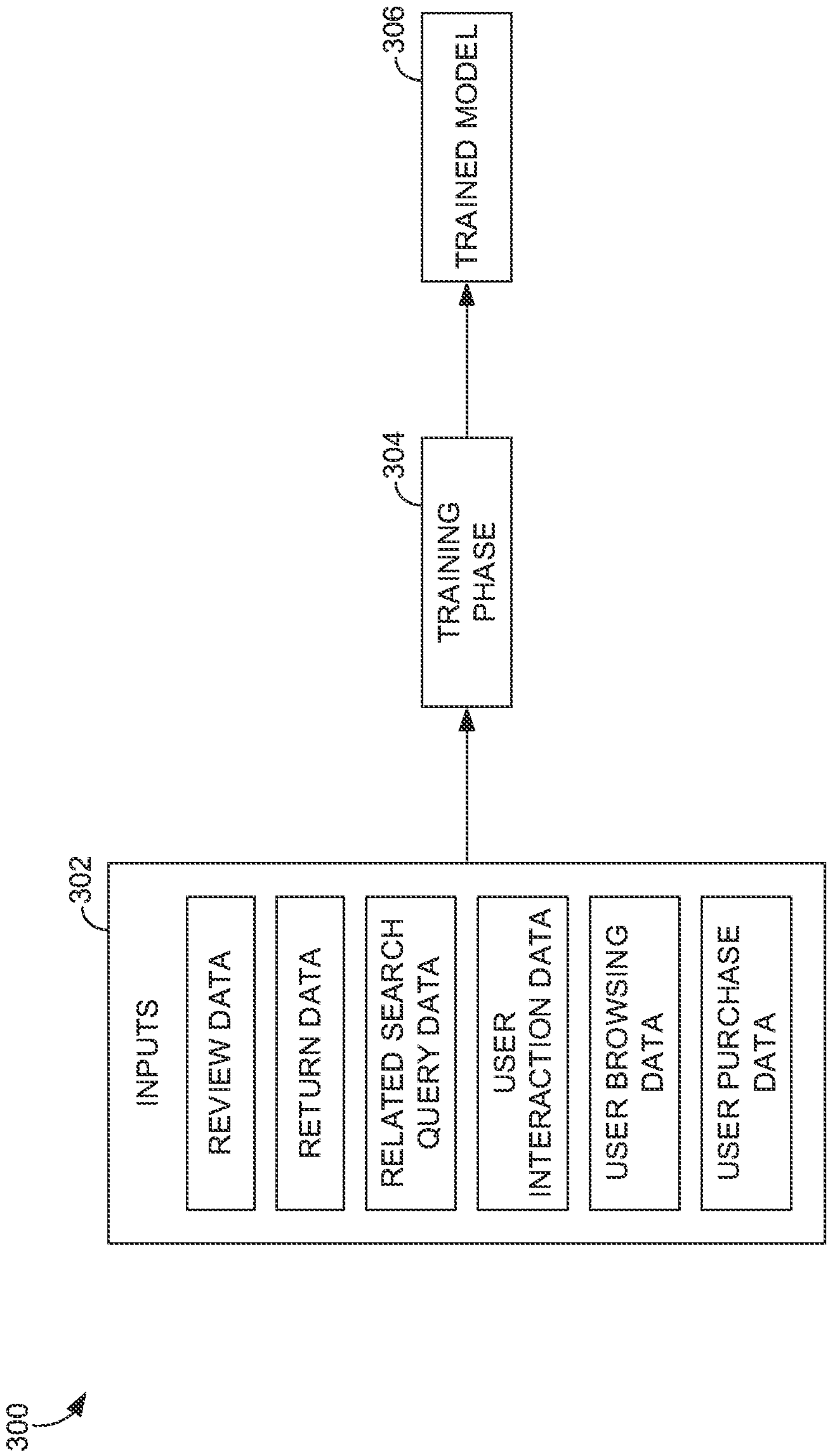
FIG. 3 is a diagram illustrating a process for training a model in accordance with some implementations of the present disclosure.

Returning to FIG. 1, the model 114 can be a machine learning model (e.g., a neural network, a support vector machine, and/or a boosting machine) trained by the training component 116. FIG. 3 illustrates an example process 300 for training a model (e.g., the model 114 or the model 206). At a high level, the model is trained using inputs 302. The inputs can include review data, return data, related search query data, user interaction data, user browsing data, and/or user purchase data, for example. The inputs 302 are discussed in more detail below. Using the inputs 302, the model is trained during a training phase 304—e.g., by the training component 116. As discussed below, the model can be trained using supervised learning, unsupervised learning, or reinforcement learning. The resulting trained model 306 can rank attributes based on the attributes' relevance to user search intent, for example.

In some embodiments, the training is supervised. The training component 116 receives labeled data that, for example, comprises a ranked (e.g., hierarchical) list of attributes that are most important to user search intent or ability to discern difference of items from a set of item listings provided in response to a search query. For example, labeled data for the search query "open-world video games" could comprise a ranked (e.g., ordered) list of attributes such as "genre; publisher; ESRB rating". During training, the training component 116 provides the model 114 with a search query and an unordered set of the attributes as an input, and the model 114 ranks the attributes. The training component 116 compares the model's ranking of the attributes to the corresponding labeled data and determines a loss using any suitable loss function. The training component 116 updates the model based on the loss using backpropagation or any other suitable method. This process can be performed over any number of iterations in order to train the model 114.

However, in some cases, labeled data could be scarce or unavailable—e.g., due to the size of the number of possible search queries. Accordingly, in some embodiments, the training component 116 trains the model 114 using a reinforcement learning approach. In order to generate training data, in some aspects, the training component 116 retrieves search queries (e.g., that have previously been received from user devices) and corresponding item listings. The training component further determines corresponding attributes—e.g., using any of the methods or processes previously described in reference to the attribute determination component 112.

During training, the model 114 receives, as input, a search query, and corresponding sets of attributes and/or item listings from the training data. The model 114 ranks the attributes, and the training component 116, using a reward function, determines a reward amount based on the model's ranking. In aspects, the training component 116 (e.g., using the reward function) determines the reward by comparing the model's predicted attribute ranking against one or more types of data associated with the query.

In aspects, the reward function rewards the model 114 for assigning higher ranks to attributes present in review data—e.g., attributes mentioned in reviews of one or more items associated with the item listings. For example, if the search query in question is "cake platters" and several of the related item listings are associated with user-submitted reviews that explicitly or implicitly mention the related cake platter's diameter (e.g., "the cake platter's diameter is smaller than advertised" or "this platter is the perfect size"), the training component 116 rewards the model 114 for ranking the attribute "diameter" higher than other attributes or penalizes the model 114 for ranking "diameter" lower than other attributes.

In the same or other aspects, the reward function rewards the model 114 for assigning higher ranks to attributes present in return data. As background, some listing platforms provide users with the ability to return purchased items. In some cases, when returning an item, the user can provide information or submit a comment regarding their reason(s) for returning the item (e.g., "the cake platter was smaller than expected"). This information can be useful for training the model 114 since it can indicate which attribute(s) were dispositive with respect to the user's decision to return the item.

In the same or other aspects, the reward function rewards the model 114 for assigning higher ranks to attributes present in related search query data. For example, in aspects, the training component 116 accesses data regarding search queries submitted by users that are related to (e.g., that immediately follow and/or contain common search terms as) the search query in question. For example, related search query data could indicate that users who have searched "cake platters" have submitted subsequent queries such as "white cake platters" and "green cake platters." In this case, "color" is identified as an attribute of interest, so the reward function rewards the model 114 for assigning a higher rank to the attribute "color" based on the related search query data.

In the same or other aspects, user-specific data (e.g., specific to the user who submitted the search query)—such as user interaction data, user browsing data, and/or user purchase data—is received by the model 114. In these aspects, the reward function can, for example, reward the model 114 for assigning higher ranks to attributes for which one or more of the items identified by the search component 110 comprise values in which the user who submitted the search query has previously demonstrated interest. For example, if a user searches for "bird baths" and has previously interacted with, browsed, and/or purchased lawn decorations made of stone, the reward function rewards the model 114 for assigning a higher ranking to the attribute "material"—e.g., if one or more of the item listings identified by the search component 110 comprises the value "stone" for the attribute "material".

After the reward is determined (e.g., by evaluating the model's ranking of each attribute), the training component 116 updates the model 114 based on the reward. This process can be performed over any number of iterations in order to train the model 114.

Figure 4:
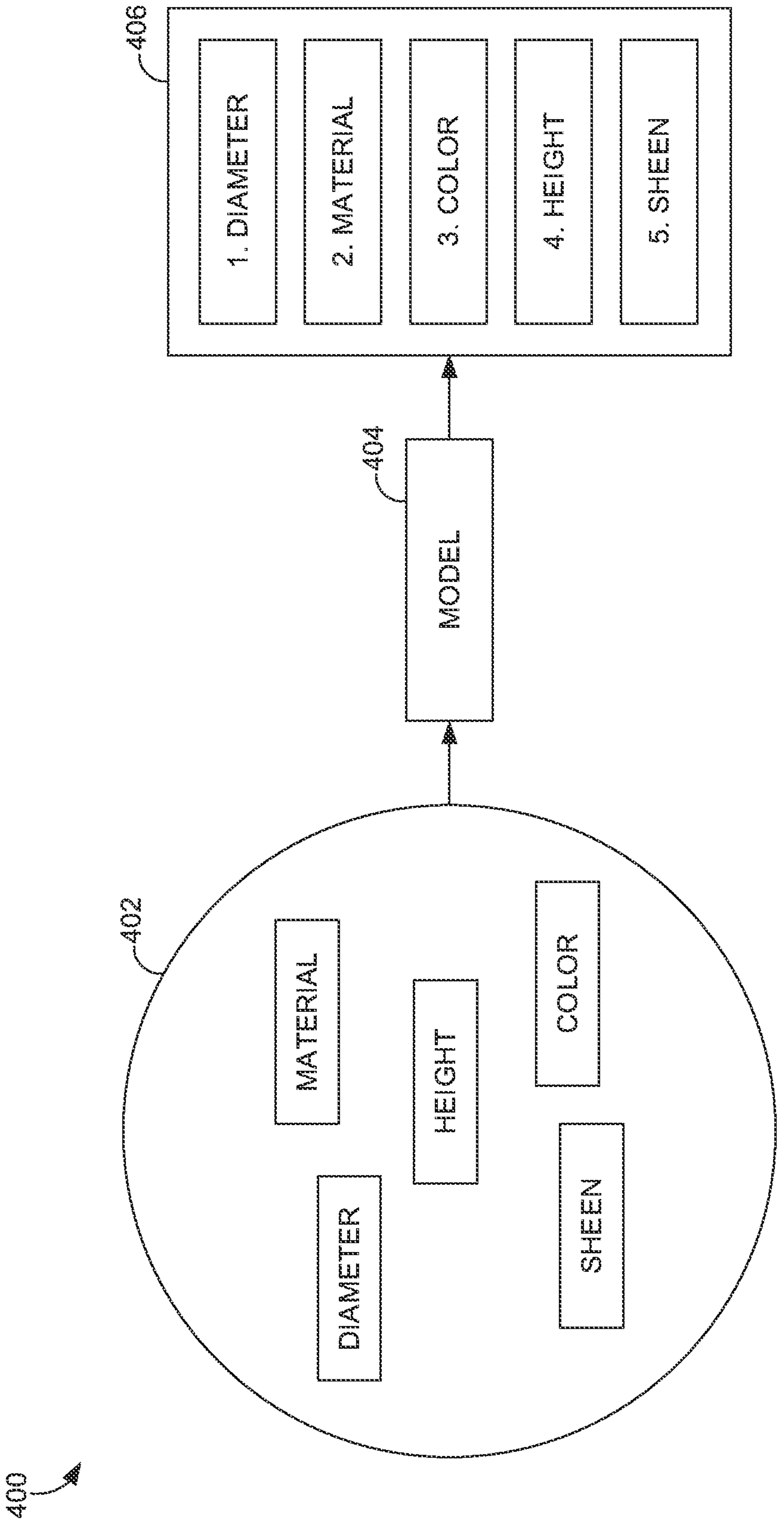
FIG. 4 is a diagram illustrating a process for generating a hierarchy of attributes in accordance with some implementations of the present disclosure.

FIG. 4 illustrates an example process 400 in which a model 404 ranks attributes (e.g., after training). The model 404 can correspond to the model 114 of FIG. 2. The model 404 receives an unordered set of attributes 402 (e.g., from the attribute determination component 112 of FIG. 1). The model 404 ranks the attributes based on training (e.g., performed by the training component 116 of FIG. 1) and provides an output 406 comprising a ranked (e.g., hierarchical or ordered) set of the attributes.

Returning to FIG. 1, although the attribute determination component 112 and the model 114 are described above as separate components, in some embodiments, the attributes are both determined and ranked by a single component (e.g., a single model). Additionally, although the model 114 is described in some aspects as a machine learning model which can be trained using reinforcement learning, it is contemplated that the model 114 can be trained using any other method—or not trained at all (e.g., configured to analyze/parse any of the types of data discussed herein to determine and/or rank attributes without the use of machine learning).

The value determination component 118 of FIG. 1 determines one or more values of attributes for item listings that correspond to search results. For example, the value determination component 118 could determine that a search result corresponds to an item listing that, for the attribute "material," comprises the value "glass". Once determined, the value can be provided to the user interface component 120 for display, as further discussed below. In order to determine an attribute value for an item listing, the value determination component 118 can use any or all of the techniques previously discussed with respect to the attribute determination component 112. For example, the value determination component 118 can parse one or more predefined fields of the item listing (e.g., can look at a field labeled "material" to determine a value for the attribute "material" if such a field exists), utilize NLP techniques, and/or analyze one or more images of the item listing.

The user interface component 120 provides a visual indication of an attribute, such as the top-ranked attribute (e.g., the attribute ranked the highest by the model 114). In aspects, a search result of the plurality of search results provided by the search component 110 comprises the visual indication. The user interface component 120 can additionally (or alternatively) provide a visual indication of a value for the attribute for the item listing that corresponds to the search result. For example, if the attribute is "genre" and the search result corresponds to an item listing for a fantasy game (i.e., the value for the attribute is "fantasy"), the visual indication can indicate that the video game is a fantasy game. The value can be determined by the value determination component 118, as previously discussed.

In aspects, the visual indication of the attribute and/or value is a textual indication (e.g., "fantasy" or "genre: fantasy"). In the same or other aspects, the visual indication is provided in a thumbnail image of the search result. For example, in some aspects, the user interface component 120 highlights (e.g., brightens or alters a color of) a portion of a thumbnail image of the search result that corresponds to the attribute or value. As another example, text indicative of the attribute or value can be superimposed on the thumbnail image. In the same or other aspects, the user interface component 120 selects a thumbnail image from a plurality of images of the item listing based on the thumbnail image comprising the attribute or value. For example, if the top-ranked attribute for the search query "cake platters" is "diameter" and a default thumbnail image for a search result corresponding to an item listing does not indicate the item's diameter, the user interface component 120 can instead display a different image of the item listing as the thumbnail image in the search result (e.g., an image of the item listing that comprises or indicates the attribute or value).

The user interface component 120 does not necessarily select (e.g., for display) the highest-ranked attribute. In some aspects, the user interface component 120 determines that an attribute (e.g., the top-ranked attribute) or a value thereof is already visible (or otherwise indicated) in a search result and selects another attribute (e.g., the next-highest-ranked attribute) for display. For example, if the highest-ranked attribute for the search query "cake platters" is "diameter" but the search result's title includes the cake platter's diameter (or the diameter is indicated in the thumbnail image), the user interface component 120 can provide a visual indication of a different attribute or value.

Figure 5:
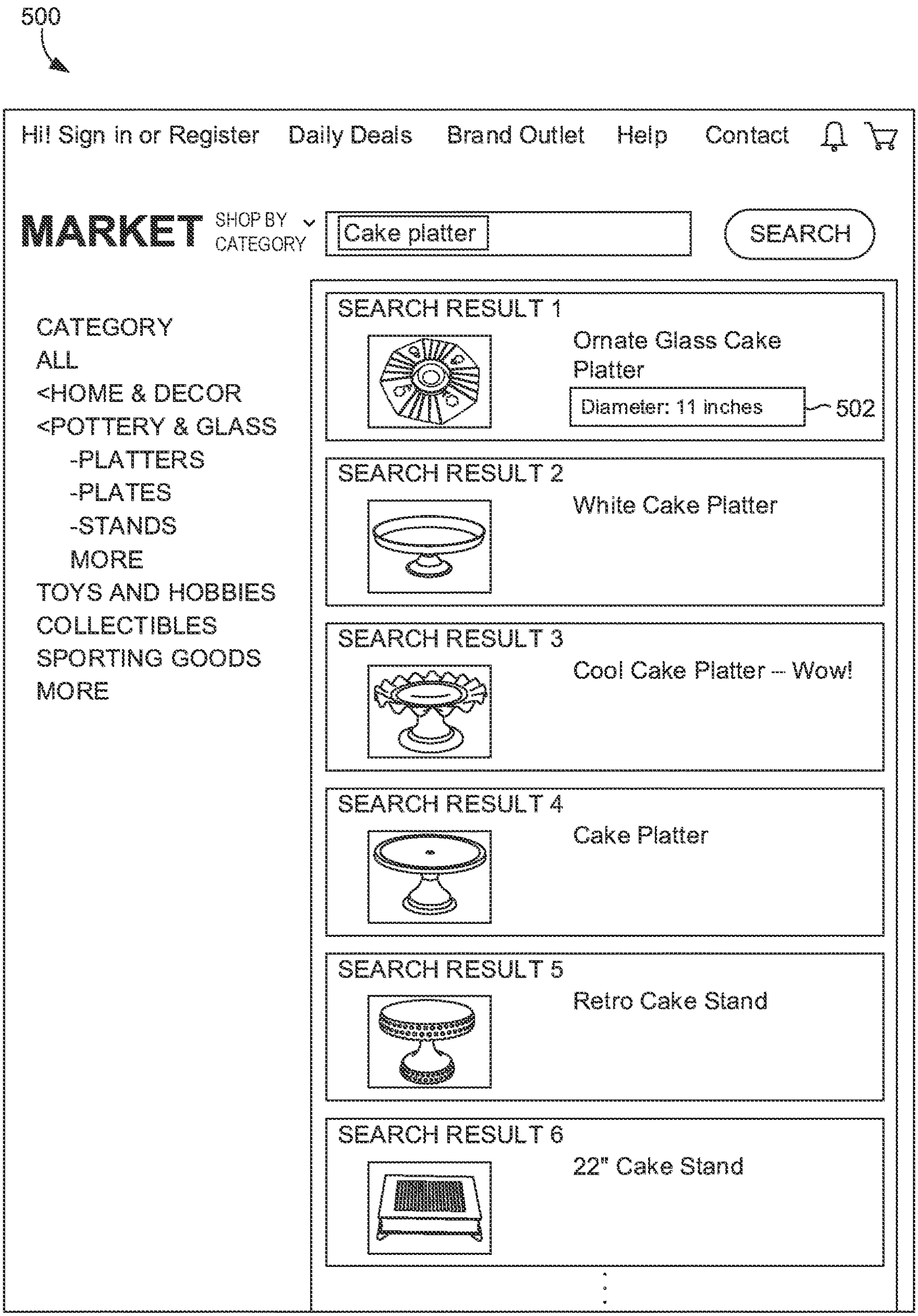
FIG. 5 is a diagram illustrating search results with a custom attribute of an item shown with a search result in accordance with some implementations of the present disclosure.

FIG. 5 illustrates an example user interface 500 similar to the user interface 200 of FIG. 2. The user interface 500 of FIG. 5, however, additionally comprises a visual indication 502 of an attribute and a value thereof. In this case, the attribute is "diameter" and the value of the attribute is "11 inches". Accordingly, a user viewing the search result can easily determine the cake platter's size without accessing the item listing for the "Ornate Glass Cake Platter," saving the user time and decreasing I/O and network costs, for example. While the attribute and attribute value are provided for only a single search result in the example of FIG. 5, the attribute and attribute value can be provided for any number of search results.

In some aspects, the user interface component 120 provides a user with one or more search result filters based on one or more attributes ranked by the model 114. The search component 110 can order, select, or filter search results (or item listings) based on the filter(s). For instance, using the example in which a "diameter" attribute for cake platters is generated, the search component 110 could present search results ordered based on values for the "diameter" attribute (e.g., organized in ascending or descending order according to diameter). Alternatively, again using the diameter example, the search component 110 could use the attribute to select/filter cake platters such that only cake platters with a particular diameter are presented. In some cases, one or more user interface elements are provided by the user interface component 120 to allow the user to specify or select a particular value or range of values for viewing items with the specified/selected value or range of values. In the previous example, the "diameter" attribute could be added as a filter option with a text box allowing a user to enter a particular seat diameter value or particular range of diameter values.

In aspects, the model 114 is updated based on a user purchase decision. If the user interface component 120 provides a visual indication of an attribute or value of an item listing and the user purchases the corresponding item, the model 114 can be updated (e.g., via backpropagation) such that it prioritizes the same or similar attributes in the future—e.g., with respect to the user and/or the item's product category. For example, if the user searches "bird baths," the user interface component 120 provides a visual indication that a bird bath identified by the search component 110 comprises stone, and the user purchases the stone bird bath, the model can be updated (e.g., by the training component 116) such that the attribute "material" is prioritized in the future when one or more items identified by the search component 110 comprise stone—e.g., when the same user provides another search query and/or when any user searches for bird baths or related items.

Example Methods for Determining and Presenting Attributes for Search

Figure 6:
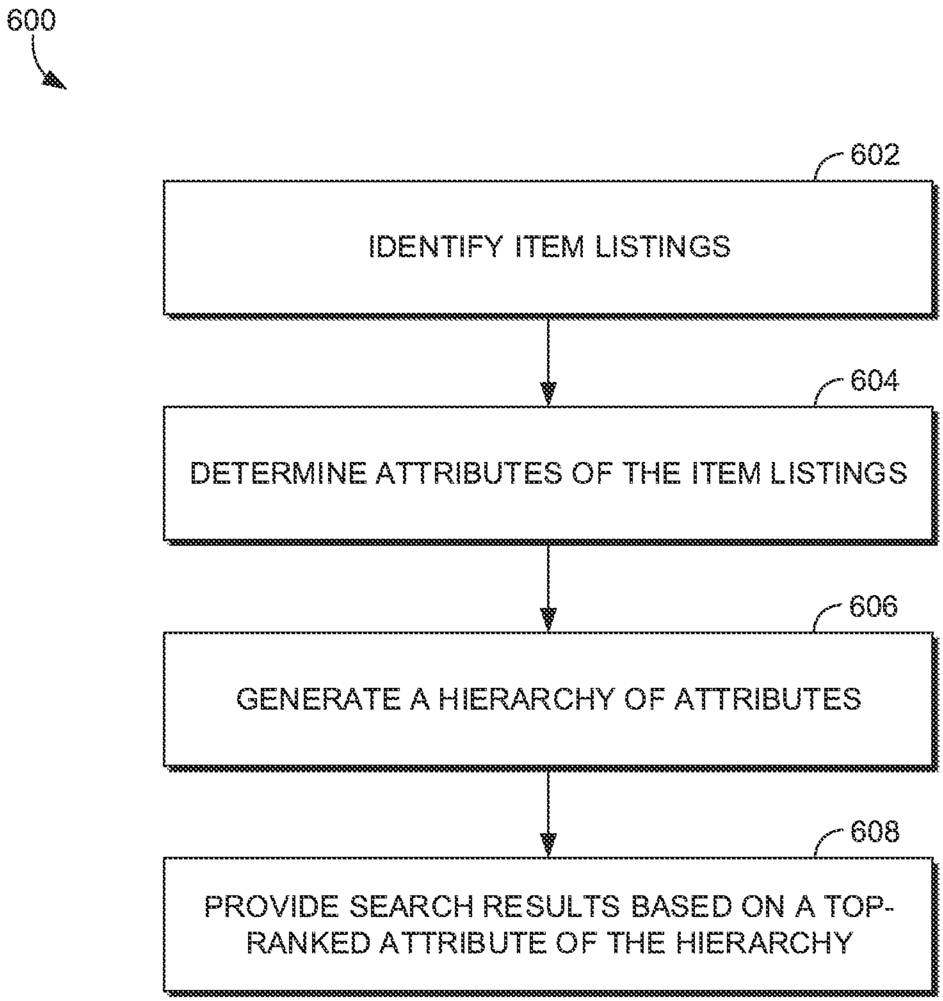
FIG. 6 is a flow diagram showing a method for providing search results in accordance with some implementations of the present disclosure.

With reference now to FIG. 6, a flow diagram is provided that illustrates a method 600 for determining and presenting attributes for search. The method 600 can be performed, for instance, by the search system 104 of FIG. 1. Each block of the method 600 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 602, item listings are identified. The item listings can be identified based on a search query—e.g., a search query received from a user and/or user device. The item listings can be retrieved from an item listing datastore.

Attributes of the item listings are determined, as shown at block 604. The attributes can be determined by analyzing images and/or text of the item listings. In aspects, attributes are determined and/or selected based on their ability to distinguish item listings from one another. For example, an attribute can be determined or selected if (a) a first item listing comprises a first value of an attribute and (b) a second item listing comprises a second value of the attribute, wherein the second value is different than the first value.

At block 606, a hierarchy of the attributes is generated. The hierarchy of the attributes can be generated by a model. The model can be or comprise a machine learning model, such as a neural network, support vector machine, or boosting machine. In aspects, the model organizes or ranks the attributes into the hierarchy based on one or more of review data, return data, and related search query data.

At block 608, search results are provided based on a top-ranked attribute of the attributes. Each of the search results can correspond to a respective item listing of the item listings and can comprise a thumbnail image and a title, for example. In aspects, providing the search results comprises providing a visual indication of the top-ranked attribute and/or a value thereof. (It should be noted that in some cases, a visual indication of an attribute other than the top-ranked attribute is provided instead of or in addition to the visual indication of the top-ranked attribute.) The visual indication can be provided in reference to (e.g., within or adjacent to) a search result in a user interface. The particular attribute and/or attribute value (as well as the search result(s) for which the visual indication is provided) can, for example, be selected based on a determination that the visual indication would not be redundant with information already present in the search result—e.g., a determination that the search result (e.g., a title or a thumbnail image of the search result) does not comprise the attribute (and/or the value). In some aspects, the visual indication comprises a modification of a thumbnail image of the search result (e.g., highlighting or indicating the attribute or value), selection of a thumbnail image, and/or a user-selectable filter for the attribute and/or value.

Figure 7:
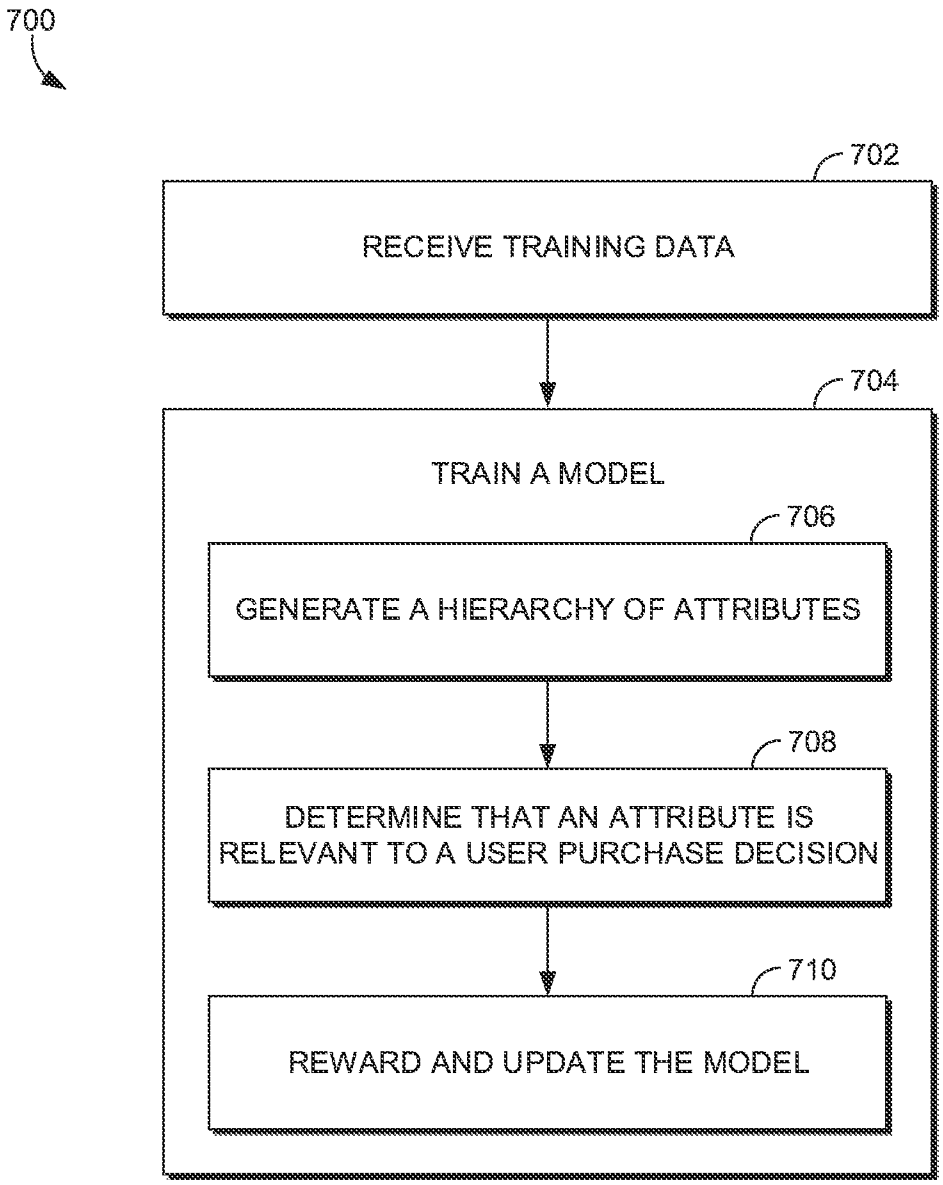
FIG. 7 is a flow diagram showing a method of training a model in accordance with some implementations of the present disclosure.

Turning next to FIG. 7, a flow diagram is provided showing a method 700 for training a model. The method 700 can be performed, for instance, by the training component 116 of FIG. 1. As shown at block 702, training data is received. The training data can comprise search queries, pluralities of item listings that correspond to respective search queries, and/or pluralities of attributes that correspond to respective pluralities of item listings (and/or search queries).

At block 704, a model is trained. The model can be or comprise a machine learning model, such as a neural network, support vector machine, or boosting machine. At block 706, a hierarchy of attributes is generated by the model.

At block 708, an attribute relevant to user search intent and/or item differentiation can be determined. In aspects, review data, return data, and/or related search query data are analyzed in order to determine that an attribute is (or could be) relevant. For example, if users have previously provided reviews corresponding to an item listing for a cake platter indicating that the cake platter was smaller than expected, an attribute such as "size" or "diameter" could be determined.

At block 710, the model is rewarded and updated. In aspects, the model is trained via reinforcement learning, and the model is rewarded based on its ranking of the attribute determined at block 708. For example, the higher the model ranked the attribute, the larger the size or weight of the reward can be. In other aspects, the model is trained on labeled data using supervised learning. The model can be updated based on the reward using backpropagation, for example.

Exemplary Operating Environment

Figure 8:
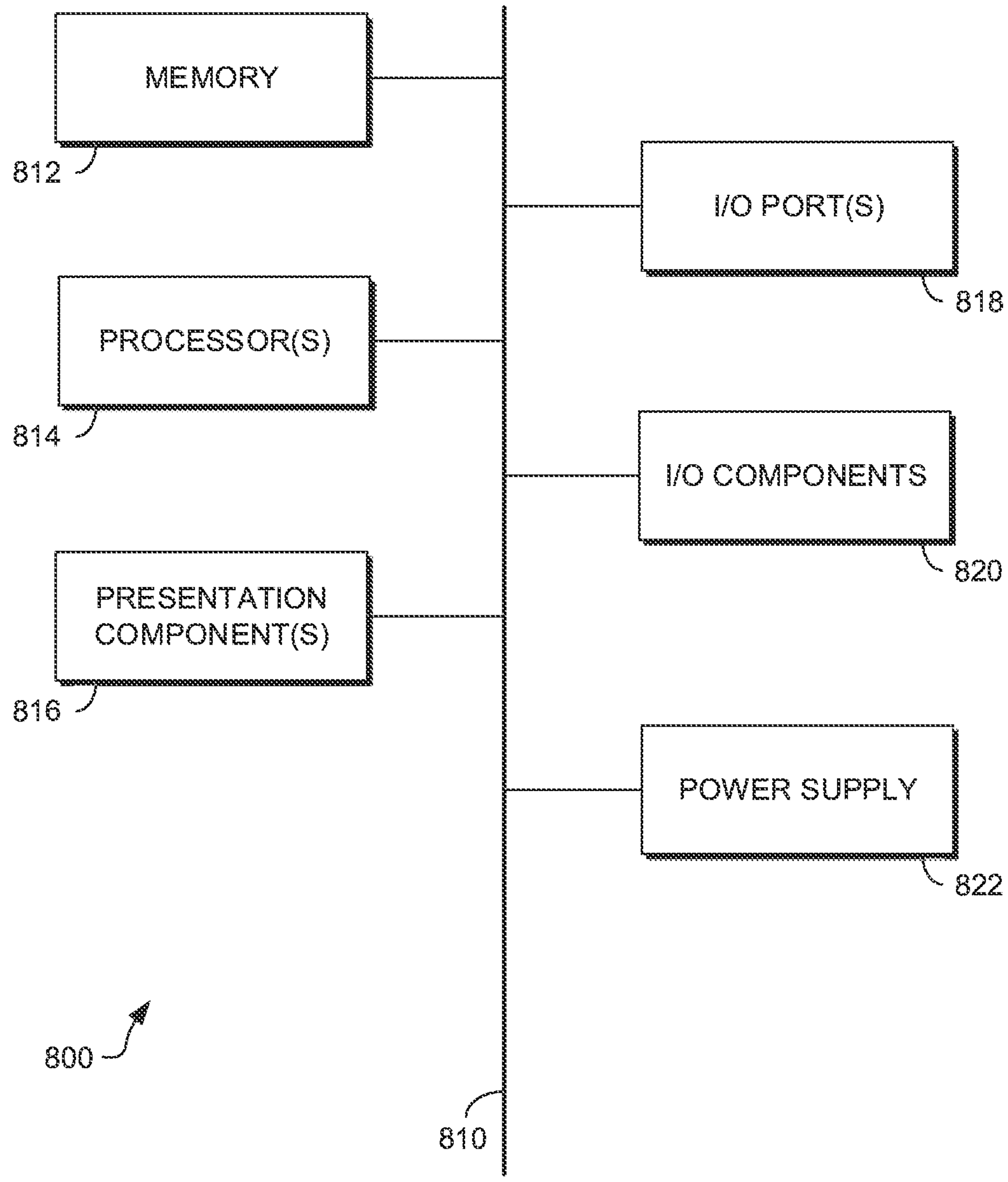
FIG. 8 is a block diagram of an exemplary computing environment suitable for use in implementations of the present disclosure.

Having described implementations of the present disclosure, an exemplary operating environment in which embodiments of the present technology can be implemented is described below in order to provide a general context for various aspects of the present disclosure. Referring initially to FIG. 8 in particular, an exemplary operating environment for implementing embodiments of the present technology is shown and designated generally as computing device 800. Computing device 800 is but one example of a suitable computing environment and is not intended to suggest any limitation as to the scope of use or functionality of the technology. Neither should the computing device 800 be interpreted as having any dependency or requirement relating to any one or combination of components illustrated.

The technology can be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology can be practiced in a variety of system configurations, including hand-held devices, consumer electronics, general-purpose computers, more specialty computing devices, etc. The technology can also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output (I/O) ports 818, input/output components 820, and illustrative power supply 822. Bus 810 represents what can be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one can consider a presentation component such as a display device to be an I/O component. Also, processors have memory. The inventors recognize that such is the nature of the art, and reiterate that the diagram of FIG. 8 is merely illustrative of an exemplary computing device that can be used in connection with one or more embodiments of the present technology. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory can be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which can be built in. Illustrative components include a microphone, joystick, game pad, satellite dish, scanner, printer, wireless device, etc. The I/O components 820 can provide a natural user interface (NUI) that processes air gestures, voice, or other physiological inputs generated by a user. In some instances, inputs can be transmitted to an appropriate network element for further processing. A NUI can implement any combination of speech recognition, touch and stylus recognition, facial recognition, biometric recognition, gesture recognition both on screen and adjacent to the screen, air gestures, head and eye-tracking, and touch recognition associated with displays on the computing device 800. The computing device 800 can be equipped with depth cameras, such as, stereoscopic camera systems, infrared camera systems, RGB camera systems, and combinations of these for gesture detection and recognition. Additionally, the computing device 800 can be equipped with accelerometers or gyroscopes that enable detection of motion.

The present technology has been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements can be employed to achieve the desired functionality within the scope of the present disclosure. For example, the components in the embodiments depicted in the figures are shown with lines for the sake of conceptual clarity. Other arrangements of these and other components can also be implemented. For example, although some components are depicted as single components, many of the elements described herein can be implemented as discrete or distributed components or in conjunction with other components, and in any suitable combination and location. Some elements can be omitted altogether. Moreover, various functions described herein as being performed by one or more entities can be carried out by hardware, firmware, and/or software, as described below. For instance, various functions can be carried out by a processor executing instructions stored in memory. As such, other arrangements and elements (e.g., machines, interfaces, functions, orders, and groupings of functions) can be used in addition to or instead of those shown.

Embodiments described herein can be combined with one or more of the specifically described alternatives. In particular, an embodiment that is claimed can contain a reference, in the alternative, to more than one other embodiment. The embodiment that is claimed can specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present technology can generally refer to the technical solution environment and the schematics described herein, it is understood that the techniques described can be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and can be employed without reference to other features and subcombinations. This is contemplated by and is within the scope of the claims.

What is claimed is:

1. One or more computer storage media storing computer-useable instructions that, when used by a computing device, cause the computing device to perform operations, the operations comprising:

identifying, by at least one of one or more servers of a search system, a plurality of item listings based on a search input;

providing, by at least one of the one or more servers of the search system, data based on the search input and the plurality of item listings as input to a machine learning model trained on attributes of item listings from user interaction data from the search system, the user interaction data comprising at least one of: search data, browse data, item review data, and item return data;

generating, by the machine learning model, a ranking of attributes for the plurality of item listings, wherein the machine learning model determines the ranking of the attributes based at least in part on analysis of differences in attribute values among the plurality of item listings to determine an extent to which attributes distinguish the plurality of item listings from one another, and wherein the machine learning model determines the ranking of the attributes based at least in part on analysis of information visible in search snippets for the plurality of item listings to determine an extent to which attributes are apparent from the search snippets; and providing, by at least one of the one or more servers of the search system, one or more search results for presentation on a user device based on the ranking of the attributes.

2. The one or more computer storage media of claim 1, wherein the providing the one or more search results based on the ranking of the attributes comprises:

providing a visual indication of a value of a top-ranked attribute for a search result of the one or more search results.

3. The one or more computer storage media of claim 2, wherein the search result corresponds to an item listing of the plurality of item listings, and wherein the visual indication comprises text indicating that the item listing comprises the value of the top-ranked attribute.

4. The one or more computer storage media of claim 2, wherein the search result comprises an image of an item listing of the plurality of item listings, wherein the item listing comprises the value of the top-ranked attribute, and wherein no visual characteristic of the value is visible in the image.

5. The one or more computer storage media of claim 2, wherein the search result comprises an image of an item listing of the plurality of item listings, wherein the item listing comprises the value of the top-ranked attribute, and wherein the visual indication of the top-ranked attribute is in the image.

6. The one or more computer storage media of claim 1, the operations further comprising:

updating a user interface to provide a filter for a top-ranked attribute.

7. The one or more computer storage media of claim 6, the operations further comprising:

receiving a selection of the filter; and providing a visual indication of another attribute of the attributes.

8. The one or more computer storage media of claim 1, wherein an attribute of the attributes is determined from one or more images in item listings of the plurality of item listings.

9. The one or more computer storage media of claim 1, wherein an attribute of the attributes is determined from one or more item descriptions in item listings of the plurality of item listings.

10. The one or more computer storage media of claim 1, wherein the ranking of the attributes is generated based at least in part on:

a first item listing of the plurality of item listings comprising a first value of an attribute of the attributes; and a second item listing of the plurality of item listings comprising a second value of the attribute, wherein the second value is different than the first value.

11. A search system having one or more servers comprising:

one or more processors; and one or more computer storage media storing computer-useable instructions that, when used by the one or more processors, causes the search system to perform operations comprising:

identifying, by at least one of the one or more servers of the search system, a plurality of item listings based on a search input;

providing, by at least one of the one or more servers of the search system, data based on the search input and the plurality of item listings as input to a model trained on attributes of item listings from user interaction data from the search system, the user interaction data comprising at least one of: search data, browse data, item review data, and item return data;

generating, by the model, a ranking of attributes for the plurality of item listings, wherein the model determines the ranking of the attributes based at least in part on analysis of differences in attribute values among the plurality of item listings to determine an extent to which attributes distinguish the plurality of item listings from one another, and wherein the model determines the ranking of the attributes based at least in part on analysis of information visible in search snippets for the plurality of item listings to determine an extent to which attributes are apparent from the search snippets; and providing, by at least one of the one or more servers of the search system, a plurality of search results corresponding to item listings of the plurality of item listings with a visual indication of a value of a top-ranked attribute based on the ranking of the attributes.

12. The search system of claim 11, wherein the search system receives the search input from a user, and wherein the model generates the ranking of the attributes based at least in part on user browsing data for the user.

13. The search system of claim 11, wherein the visual indication of the value of the top-ranked attribute comprises a selectable filter for the top-ranked attribute.

14. The search system of claim 11, wherein the visual indication of the value of the top-ranked attribute comprises a textual indication that a search result of the plurality of search results comprises the value for the top-ranked attribute.

15. The search system of claim 11, wherein the providing the plurality of search results comprises:

determining that a thumbnail image of a search result of the plurality of search results does not comprise a visual indication of the value of the top-ranked attribute;

selecting an image from an item listing of the plurality of item listings, wherein the item listing corresponds to the search result, and wherein the selecting is based on the image visually indicating the value of the top-ranked attribute; and presenting the image in the search result instead of the thumbnail image.

* * * * *